United States Patent [19]
Park

[11] Patent Number: 5,537,169
[45] Date of Patent: Jul. 16, 1996

[54] PROJECTION-LENS DRIVING APPARATUS FOR A 3-BEAM PROJECTOR

[75] Inventor: Jun-Hyun Park, Seoul, Rep. of Korea

[73] Assignee: Daewoo Electronics Co., Ltd., Seoul, Rep. of Korea

[21] Appl. No.: 524,709

[22] Filed: Sep. 7, 1995

[30] Foreign Application Priority Data

Sep. 8, 1994 [KR] Rep. of Korea ............. 94-22584
Sep. 8, 1994 [KR] Rep. of Korea ............. 94-22585

[51] Int. Cl.⁶ .................... G03B 21/00; G02D 15/14
[52] U.S. Cl. ............................... 353/101; 359/694
[58] Field of Search .................. 353/31, 94, 100, 353/101, 122; 359/677, 679, 683, 694–696, 703, 705, 821–823, 896; 348/745–747, 806–807

[56] References Cited

U.S. PATENT DOCUMENTS 5,125,733  6/1992  Lee ............................... 353/7
5,426,471  6/1995  Tanaka et al. ............. 353/745

Primary Examiner—William C. Dowling
Attorney, Agent, or Firm—Anderson Kill Olick & Oshinsky

[57] ABSTRACT

The projection-lens driving apparatus for use in a 3-beam projector comprises an upper plate, an upper projection-lens holder, a pair of cross links, a pair of lower projection-lens holders, a guide member, and a driving means for driving the guide member. The upper and the lower projection-lens holders are fitted to the guide member in such a way that they can be driven integrally using the driving means, thereby allowing images to coincide on a screen simply, accurately and, above all, simultaneously.

10 Claims, 9 Drawing Sheets

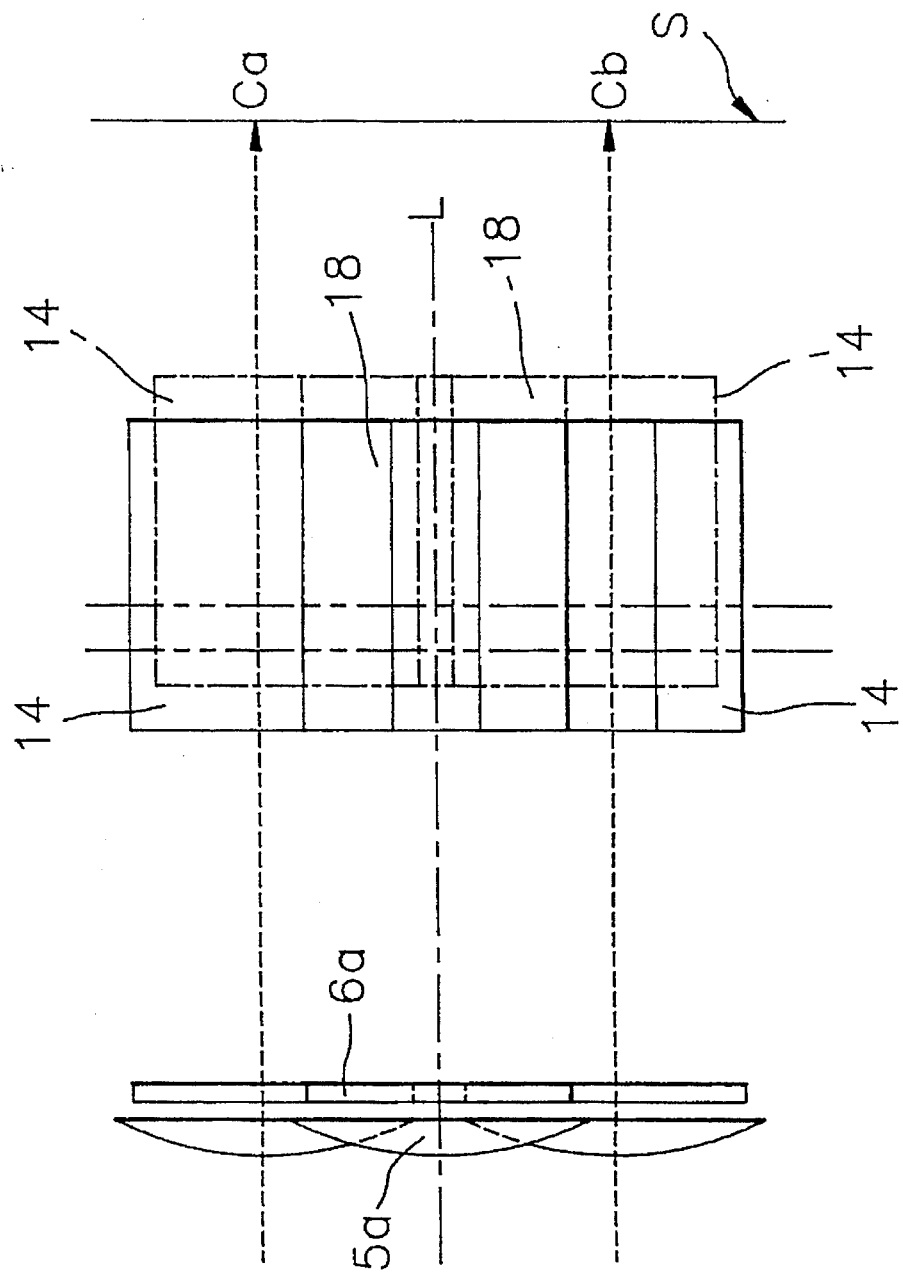

5,537,169

PROJECTION-LENS DRIVING APPARATUS FOR A 3-BEAM PROJECTOR

FIELD OF THE INVENTION

The present invention relates to a projection-lens driving apparatus for use in a 3-beam projector; and, more particularly, to an improved projection-lens driving apparatus capable of allowing three projection-lens holders incorporated in the apparatus to be driven integrally, thereby providing a simultaneous focussing of three images on a screen.

DESCRIPTION OF THE PRIOR ART

As shown in FIG. 1, a conventional 3- projector typically comprises three image-projection units 1a, 1b and 1c, each of the image-projection units, e.g., 1a, including a lamp 4a, a spherical reflecting mirror 3a, a focusing lens device 5a, a slide film or LCD (liquid crystal display) panel 6a and a projecting lens 7a, respectively. Each of the image-projecting units, e.g., 1a, is provided with an associated optical axis La. Each of the image-projecting units 1a, 1b and 1c is individually driven to coincide each of the images to thereby produce a total image on a screen S having a central axis L. Specifically, in order to produce the total image on the screen S, an operator first focuses an image projection from one of the units, e.g., 1a, on the screen S and then focuses and moves the remaining images projected from the other units 1b, 1c on the screen S to coincide the three images.

There are a number of disadvantages with such a 3-beam conventional projection. The optical axes Lb, Lc of the units 1b and 1c are inclined at a certain angle with respect to the central axis L of the screen S so that each of the images projected from the corresponding image-projecting unit has a trapezoidal shape as shown in FIG. 2, resulting in a keystoning phenomenon, the keystoning phenomenon referring to a distortion of images caused by failure of the images to coincide completely with each other, causing an eye fatigue to viewers. In addition to the above, the task of the matching and focusing the three images on the screen S becomes rather tricky and cumbersome, since each of the three image-projecting units must be individually driven and adjusted.

There is disclosed in U.S. Pat. No. 5,125,733, entitled "STEREOSCOPIC PROJECTOR AND METHOD FOR DRIVING PROJECTING LENSES" a method and an apparatus for driving projection lenses integrally in a stereoscopic projector. However, as the title well indicates, the method and apparatus in the above patent pertain to a stereoscopicc projector only.

SUMMARY OF THE INVENTION

It is, therefore, a primary object of the present invention to provide an improved projection-lens driving apparatus for use in a 3-beam projector capable of allowing three projection-lens holders, each containing a projection lens, to be driven integrally, thereby providing a simultaneous focussing of the three images on a screen.

In accordance with one aspect of the present invention, there is provided an projection-lens driving apparatus including a housing having an upper and a lower faces for use in a 3-beam projector, the projection-lens driving apparatus comprising: an upper plate fixed to the upper face of the housing and provided with a pair of straight motion guide slots and a pair of vertical motion guide slots; an upper projection-lens holder provided with a top and a bottom surfaces, a pair of protrusions, a pair of vertical holes, each of the vertical holes extending from the top surface to the bottom surface thereof, and a pair of guide slots on the top surface thereof; a pair of cross links, each of the cross links including a pair of link pieces articulated about a hinge point, wherein the upper projection-lens holder is mechanically connected to the upper face through the pair of cross links in such a way that a lower end of one link piece in each pair of link pieces in each of the cross links is coupled to one of the protrusions on the upper projection-lens holder, an upper end thereof being fitted to one of the vertical motion guide slots of the upper plate, and a lower end of the other link piece in the same pair is fitted to a corresponding one of the guide slots of the upper projection-lens holder, an upper end thereof being fitted to a corresponding one of the straight motion guide slots of the upper plate; a pair of lower projection-lens holders located on the lower face of the housing, running parallel to each other, each of the lower projection-lens holders being provided with a top and a bottom surfaces, a pair of side surfaces, a trace slot on the top surface thereof, and a horizontal inserting hole, wherein the horizontal inserting hole extending from one of the side surfaces to the other side surface thereof; a guide member including a first guide plate and a second guide plate, each of the guide plates being separated from each other, the first guide plate having a top and a bottom surfaces, a pair of engaging pins on the top surface thereof, a pair of guide rods on the bottom surface thereof and a threaded through hole passing therethrough at its center longitudinally, each of the engaging pins extending vertically upward, each of the guide rods extending horizontally in an opposite direction from each other, and the second guide plate having a top and a bottom surfaces, a pair of guide protrusions on the bottom surface thereof and a threaded recess with a predetermined depth at its center longitudinally, the threaded through hole of the first guide plate and the threaded recess of the second guide plate being aligned with each other, wherein the upper projection-lens holder and the pair of lower projection-lens holders are mechanically and integrally connected through the guide member in such a way that the pair of engaging pins of the first guide plate are inserted into the pair of vertical holes on the upper projection-lens holder, each of the guide protrusions on the bottom surface of the second guide plate is engaged with each of the corresponding trace slots on each of the lower projection-lens holders, and each of the guide rods on the first guide plate is inserted into each of the horizontal inserting holes on each of the lower projection-lens holders; and driving means for driving the guide member including a motor and a feed screw with one end thereof attached to the motor, the feed screw including a lead part and a rear part, the lead part to be engaged into the threaded recess of the second guide plate and the rear part to be engaged with the threaded recess of the second guide plate to thereby mechanically connect the first and the second guide plates, wherein a rotation of the motor will cause a corresponding rotation of the feed screw, causing the guide member to move forward or away from the screen, which will in turn cause the upper and the lower projection-lens holders fitted to the guide member mechanically to move integrally, thereby allowing the images to coincide on the screen simply, accurately and, above all, simultaneously.

In accordance with another aspect of the present invention, there is provided a projection-lens driving apparatus including a housing having an upper face and a lower face for use in a 3-beam projector, the projection-lens driving apparatus comprising: an upper plate fixed to the upper face of the housing and provided with a pair of straight motion guide slots and a pair of vertical motion guide slots; a lower plate fixed to the lower face of the housing and provided with two pair of trace slots; an upper projection-lens holder provided with a top and a bottom surfaces, a pair of protrusions, a pair of vertical holes, each of the vertical holes extending from the top surface to the bottom surface thereof, and a pair of guide slots on the top surface thereof; a pair of cross link, each of the cross links including a pair of link pieces articulated about a hinge point, wherein the upper projection-lens holder is mechanically connected to the upper plate through the pair of cross links in such a way that a lower end of one link piece in each pair of links pieces in each of the cross links is coupled to one of the protrusions on the upper projection-lens holder, an upper end thereof being fitted to one of the vertical motion guide slots of the upper plate, and a lower end of the other link piece in the same pair is fitted to a corresponding one of the guide slots of the upper projection-lens holder, an upper end thereof being fitted to a corresponding one of the straight motion guide slots of the upper plate; a pair of lower projection-lens holders, each of the lower projection-lens holders provided with a top and a bottom surfaces, a pair of rollers and a threaded hole on the top surface thereof, each of the rollers being fitted into each of the trace slots of the lower plate, the lower projection-lens holders running parallel to each other; a guide member including a guide plate and a pair of moving guide members, the guide plate having a top and a bottom surfaces, a pair of engaging pins on the top surface thereof, a pair of laterally extended slots, and a threaded recess with a predetermined depth, each of the engaging pins extending vertically upward, wherein the upper projection-lens holder and the pair of lower projection-lens holders are mechanically and integrally connected through the guide member in such a way that the pair of engaging pins of the guide plate are inserted into the pair of vertical holes on the upper projection-lens holder, and the pair of moving guide members are coupled to the pair of lower projection-lens holders via the pair of laterally extended slots of the guide plate, respectively; and driving means for driving the guide member including a motor and a feed screw with one end thereof attached to the motor, the feed screw being engaged into the threaded recess of the guide plate, wherein a rotation of the motor will cause a corresponding rotation of the feed screw, causing the guide member to move forward or away from the screen, which will in turn cause the upper and the lower projection-lens holders fitted to the guide member mechanically to move integrally, thereby allowing the images to coincide on the screen simply, accurately and, above all, simultaneously.

BRIEF DESCRIPTION OF THE DRAWINGS

The above and other objects and features of the present invention will become apparent from the following description of preferred embodiments when taken in conjunction with the accompanying drawings, in which:

FIG. 10 explains the method for driving an upper and a pair of lower projection-lens holders in accordance with the present invention.

DETAILED DESCRIPTION OF THE PREFERRED EMBODIMENTS

Figure 1:
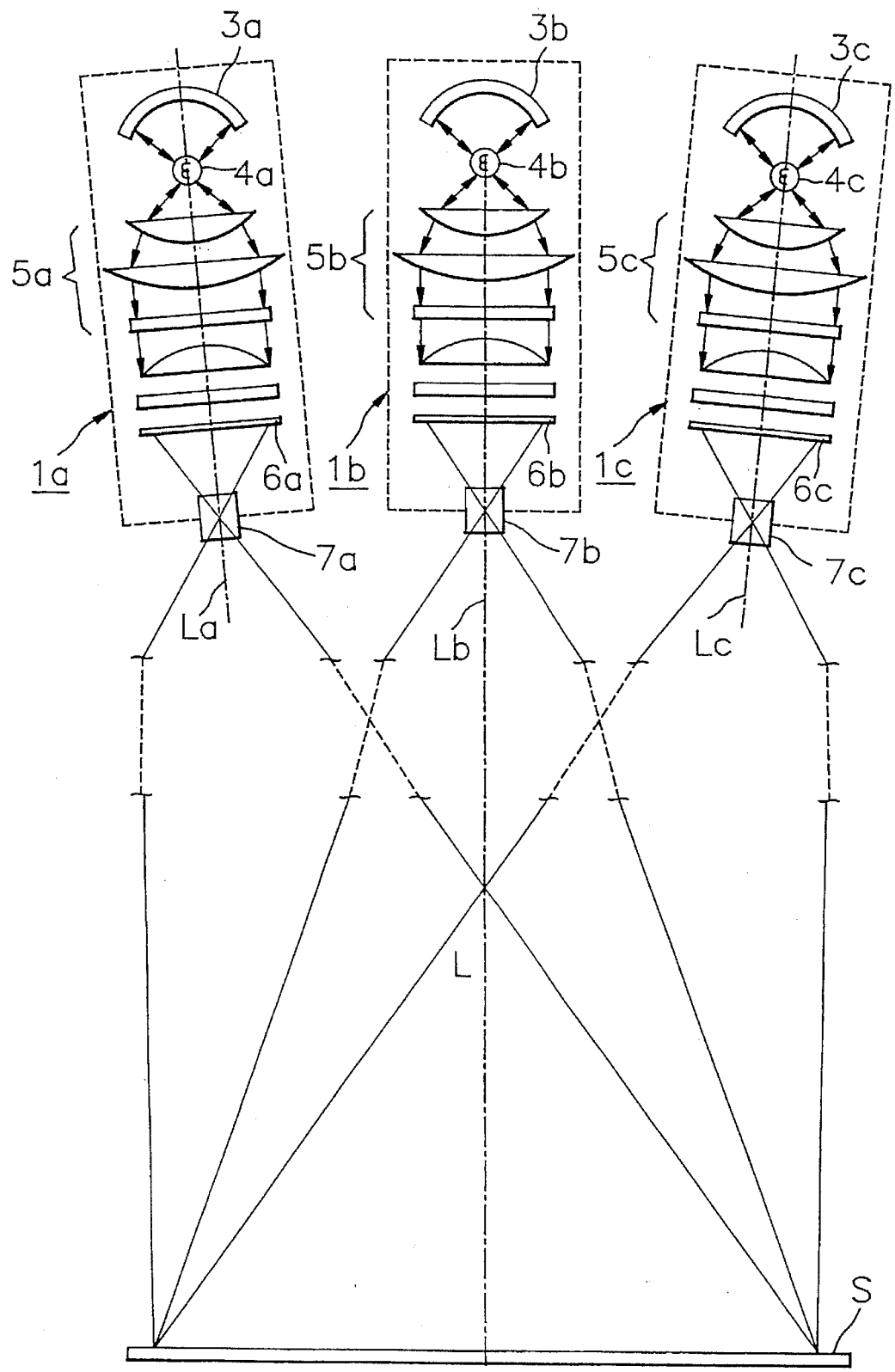
FIG. 1 presents a schematic view of a conventional stereoscopic image projector.
Figure 2:
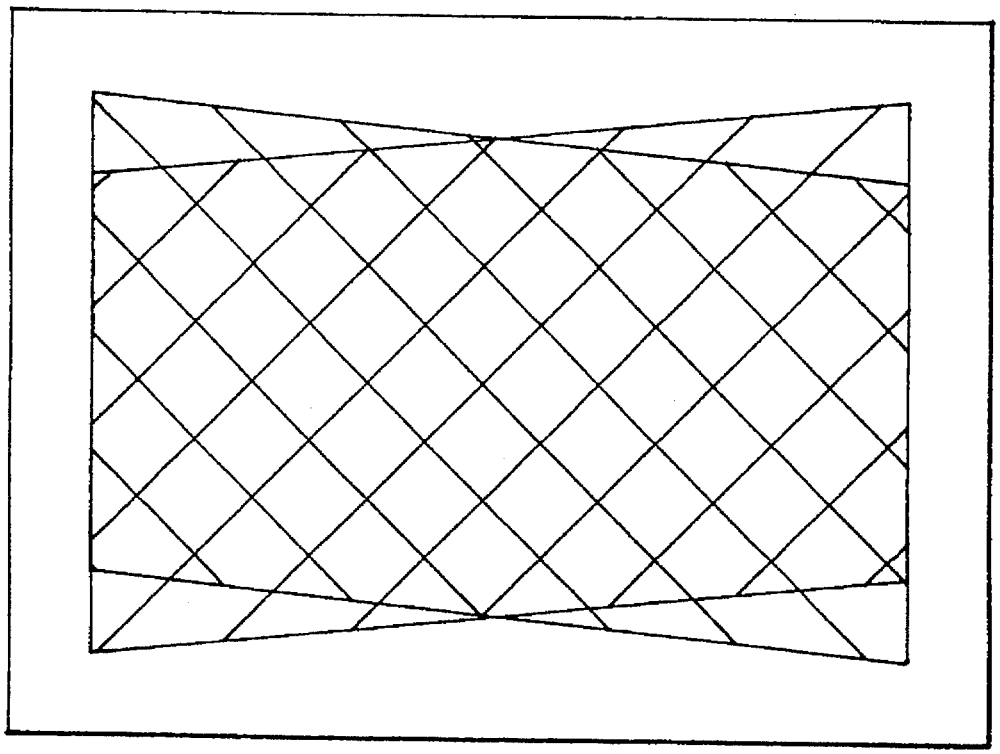
FIG. 2 depicts a schematic view of images produced on a screen in accordance with the conventional stereoscopic image projector.
Figure 3:
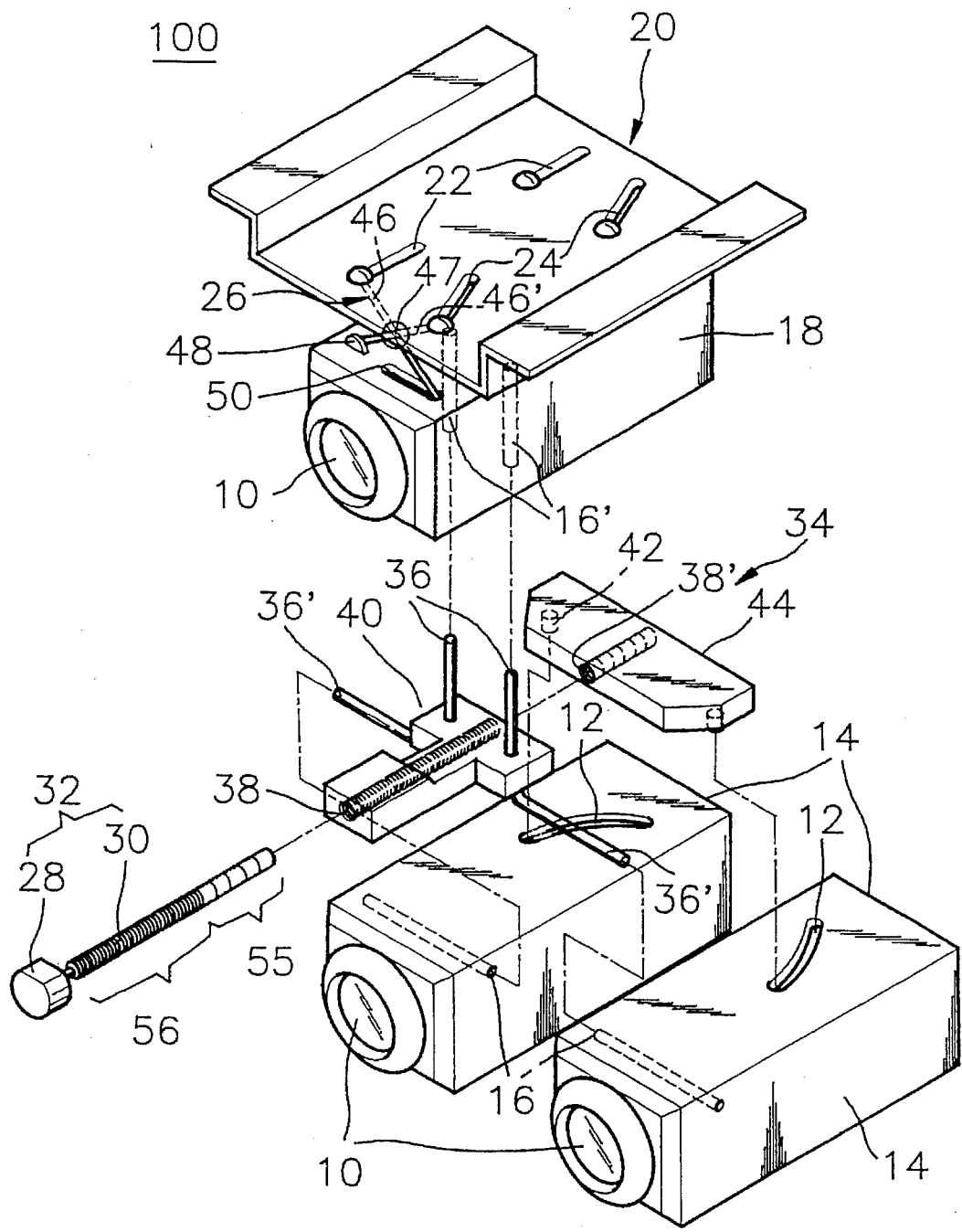
FIG. 3 shows an exploded perspective view of a first preferred embodiment of the projection-lens driving apparatus in accordance with the present invention.

There is shown in FIG. 3 an exploded perspective view of an inventive projection-lens driving apparatus 100 including a housing (not shown) having an upper and a lower face, an upper plate 20 fixed to the upper face of the housing and provided with a pair of straight motion guide slots 22 and a pair of vertical motion guide slots 24, a pair of cross links 26, each of the cross links having a pair of link pieces 46, 46', an upper projection-lens holder 18, a pair of lower projection-lens holders 14, a guide member 34 including a first guide plate 40 and a second guide plate 44, and a driving means 32 including a motor 28 and a feed screw 30.

In the inventive projection-lens driving apparatus 100, the upper and the pair of lower projection-lens holders 18,14 are identical in their general appearances and in their dimensions: they are parallelopipeds, each of them being provided with a top and a bottom surfaces that are parallel to each other, a pair of side surfaces that are parallel to each other, and a front and a rear ends that are also parallel to each other.

Each of the upper and the lower projection-lens holders 14,18 includes a projection lens 10. Each of the lower projection-lens holders 14 includes a trace slot 12 formed on the top surface thereof and is further provided with a horizontal inserting hole 16 near the rear end thereof, the horizontal inserting hole 16 extending from one side surface to the other side surface thereof. The pair of lower projection-lens holders 14 are located on the lower face of the housing, running parallel to each other and the upper projection-lens holder 18 is located above and between the pair of lower projection-lens holders 14 in such a way that an imaginary plane bisecting the upper projection-lens holder 18 vertically and longitudinally coincides with an imaginary plane parallel to and located at an equidistance from each of the two facing side surfaces from the pair of lower projection-lens holders 14. The upper projection-lens holder 18 is provided with a pair of vertical inserting holes 16', each of the vertical inserting holes 16' extending from the top surface to the bottom surface thereof, a pair of protrusions 48 and a pair of guide slots 50 on the top surface thereof.

The pair of link pieces 46, 46' in each of the cross links is articulated in a right-left and an upward-downward directions about a hinge point 47. The upper projection-lens holder 18 is attached to the upper plate 20 using the pair of cross links 26 in such a way that a lower end of one link piece 46 in each pair of link pieces 46, 46' in each of the cross links 26 is coupled to one of the protrusions 48 on the upper projection-lens holders 18, an upper end thereof being lifted to one of the vertical motion guide slots 24 of the upper plate 20, and a lower end of the other link pieces 46' in the same pair is fitted to a corresponding one of the guide slots 50 of the upper projection-lens holder 18, an upper end thereof being fitted to a corresponding one of the straight motion guide slots 22 of the upper plate 20.

The guide member 34 consisting of the first and the second guide plates 40, 44 is provided between the upper and the lower projection-lens holders 18, 14 and also engaged with the driving means 32 including the motor 38 and the feed screw 30.

The first guide plate 40 of the guide member 34 includes a top and a bottom surface, and is provided with a pair of engaging pins 36, a pair of guide rods 36' and a threaded through hole 38 passing therethrough at its center longitudinally, wherein one end of each of the engaging pins 36 is attached on the top surface of the first guide plate 40, each of the engaging pins 36 extending upward, and one end of each of the guide rods 36' is attached on the bottom surface of the first guide plate 40, each of the guides rods pointing horizontally in an opposite direction from each other.

On the other hand, the second guide plate 44 separated from the first guide plate 40 also includes a top and a bottom surface and is provided with a pair of guide protrusions 42 on the bottom surface thereof and a threaded recess 38' with a predetermined depth extending at its center longitudinally, the threaded recess 38' being aligned with the threaded through hole 38 of the first guide plate 40. Each of the guide protrusions 42 is engaged with each of the trace slots 12 on each of the lower projection-lens holders 14. Each of the guide rods 36' on the first guide plate 40 is inserted into each of the horizontal inserting holes 16 on each of the lower projection-lens holders 14 and each of the engaging pins 36 on the first guide plate 40 is inserted into each of the vertical inserting holes 16' on the upper projection-lens holder 18.

The feed screw 30 of the driving means 32 has a lead and a rear parts 55, 56 which are engaged into the threaded recess 38' of the second guide plate 44 and the threaded through hole 38 of the first guide plate 40, respectively, to thereby mechanically connecting the first and the second guide plates 40, 44. The lead part 55 of the feed screw 30 has a greater pitch than that of the rear part 56, and the pitches of the lead and the rear parts 55, 56 correspond to the pitches of the threaded recess 38' of the second guide plate 44 and the threaded through hole 38 of the first guide plate 40, respectively, so that the moving velocity of the second guide plate 44 is faster than that of the first guide plate 40.

The motor 28 of the driving means 32 is electrically connected to a control switch (not shown) on a panel (not shown) and is also connected to the feed screw 30.

Figure 4:
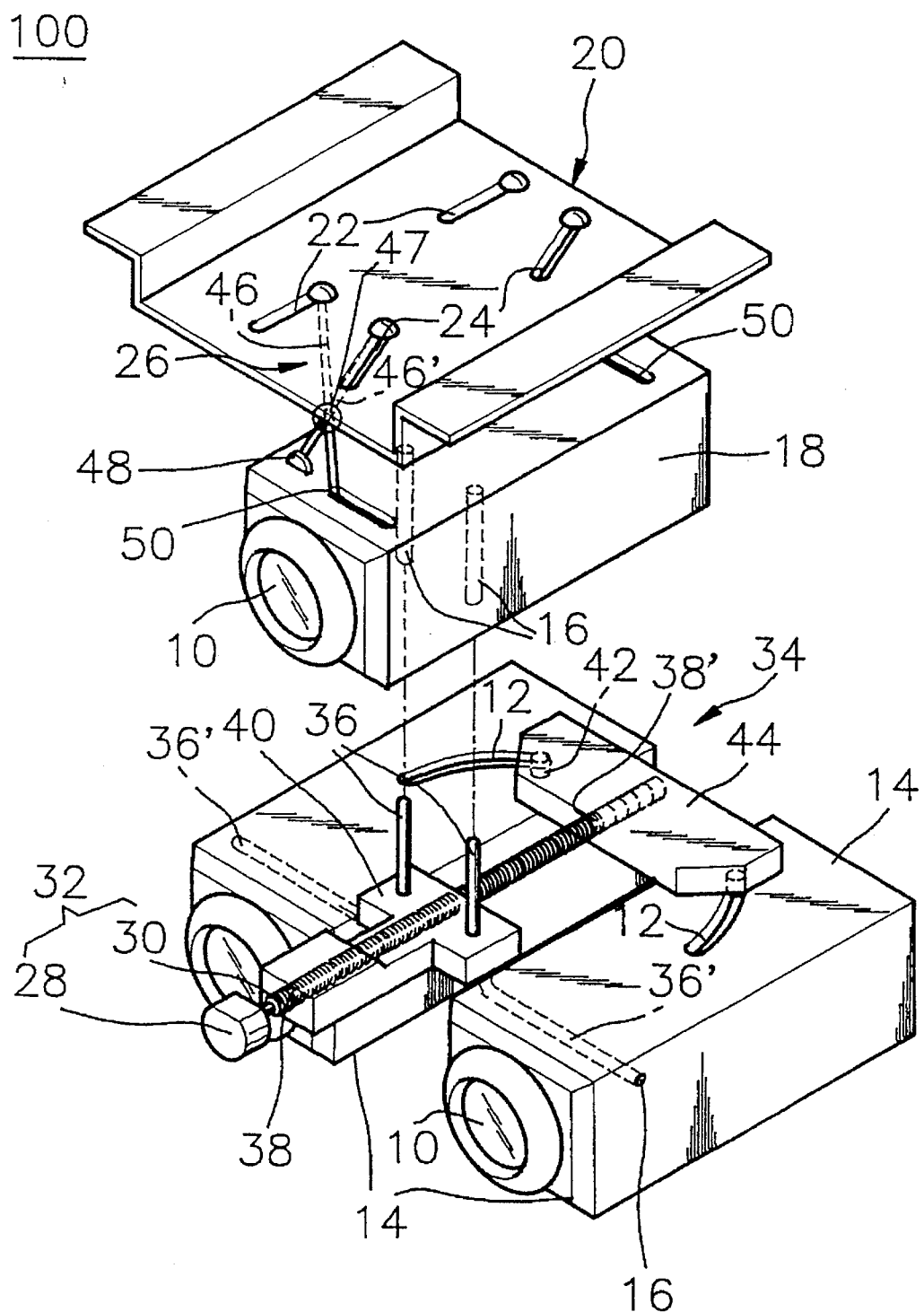
FIG. 4 represents an assembled perspective view of the first preferred embodiment of the projection-lens driving apparatus shown in FIG. 3, showing the operation thereof.

The operation of the inventive projection-lens driving apparatus 100 will now be described with reference to FIG. 4.

When an operator pushes the control switch on the panel (not shown) in order to match and focus projected images on a screen, the guide member 34 is driven toward the screen or away from the screen in response to the rotation of the motor 28 and hence the rotation of the feed screw 30 engaged with the threaded through hole 38 of the first guide plate 40 and the threaded recess 38' of the second guide plate 44. Then, the pair of lower projectionslens holders 14 connected to each other via the pair of guide rods 36' are integrally driven toward or away from the screen and inward or outward with respect to the imaginary plane parallel to and located at an equidistance from each of the two facing side surfaces of the pair of lower projection-lens holders 14, the imaginary plane further being perpendicular to the screen.

The upper projection-lens holder 18 connected to the guide member 34 through the pair of engaging pins 36 of the first guide plate 40 is also driven toward or away from the screen and the pair of lower projection-lens holders 14.

For instance, when the guide member 34 is driven toward the screen in response to the rotation of the motor 28 and hence the rotation of the feed screw 30, the pair of lower projection-lens holders 14 are integrally driven toward the screen and inward with respect to the imaginary plane along the pair of trace slots 12 by the movements of the guide rods 36' and the guide protrusions 42. At the same time, the upper projection-lens holder 18 is also driven toward the screen and the pair of lower projection-lens holders along the pair of straight motor guide slots 22 and the pair of vertical motion guide slots 24 by means of the pair of cross links 26.

On the other hand, when the guide member 34 moves away from the screen, the lower and upper projection-lens holders 14 and 18 are integrally driven in reverse. The lower projection-lens holders 14 are smoothly driven away from the screen and outward with respect to the center axis, because the moving velocity of the second guide plate 44 is faster than that of the first guide plate 40.

Therefore, by controlling the rotation of the motor 28, the upper and the lower projection-lens holders 18 and 14 can be integrally driven, allowing the operator to synchronize the images on the screen simply, conveniently, accurately, and above all, simultaneously.

Figure 5:
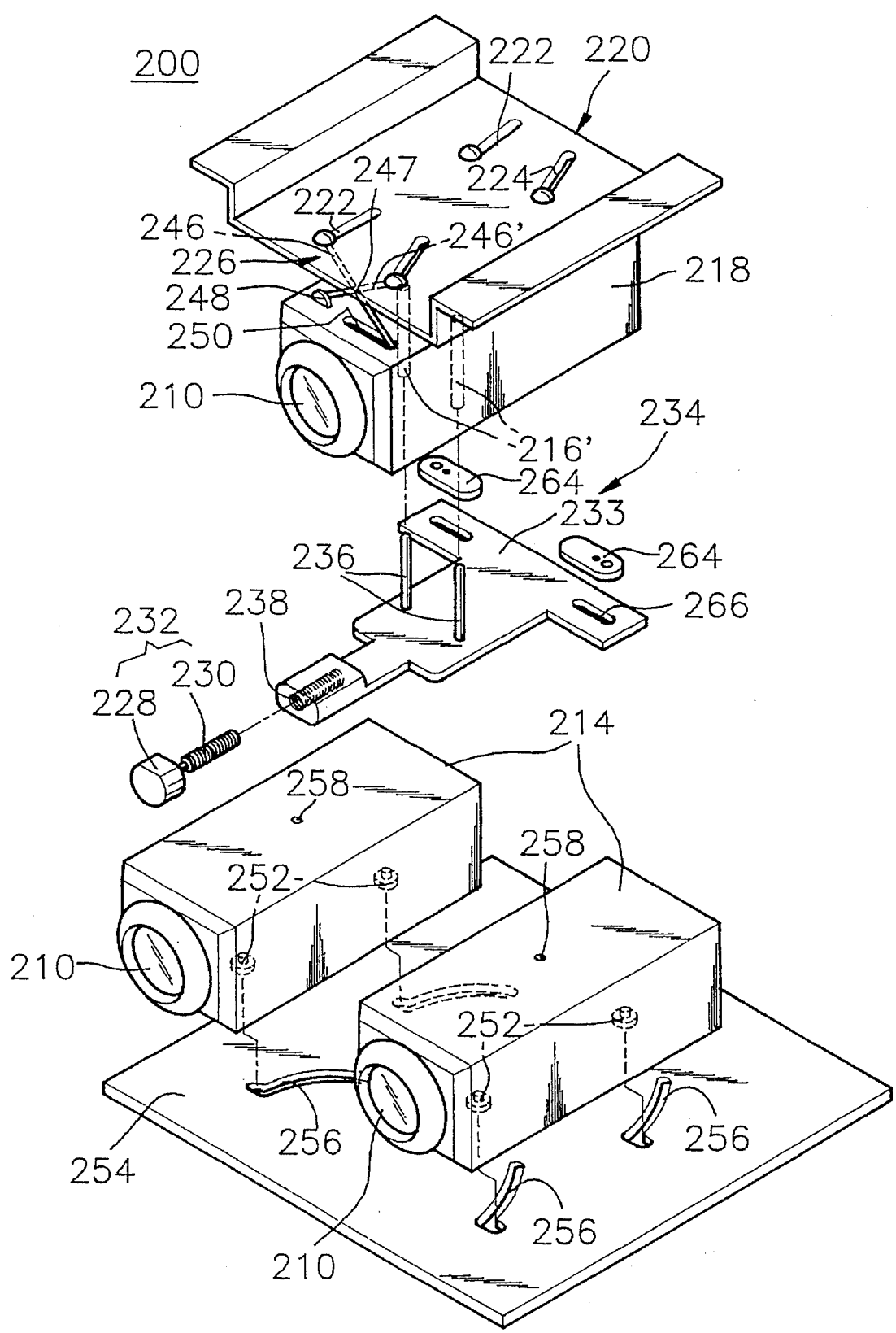
FIG. 5 provides an exploded perspective view of a second preferred embodiment of the projection-lens driving apparatus in accordance with the present invention.

There is illustrated in FIG. 5 another preferred embodiment of the inventive projection-lens driving apparatus 200. The projection-lens driving apparatus 200 includes a housing (not shown) having an upper and a lower face, an upper plate 220 fixed to the upper face of the housing and provided with a pair of straight motion guide slots 222 and a pair of vertical motion guide slots 224, a lower plate 254 fixed to the lower face of the housing and provided with two pairs of trace slots 256, a pair of cross links 226, each of the cross links 226 having a pair of link pieces 246, 246', an upper projection-lens holder 218, a pair of lower projection-lens holders 214, a guide member 234, and a driving means 232 including a motor 228 and a feed screw 230.

In the second embodiment, the upper and the pair of lower projection-lens holders 218, 214 are substantially identical in their general appearances and in their dimensions: they are parallelopipeds, each of them being provided with a top and a bottom surfaces that are parallel to each other, a pair of side surfaces that are parallel to each other, and a front and a rear ends that are also parallel to each other.

Each of the upper and the lower projection-lens holders 218, 214 includes a projection lens 210.

Figure 6:
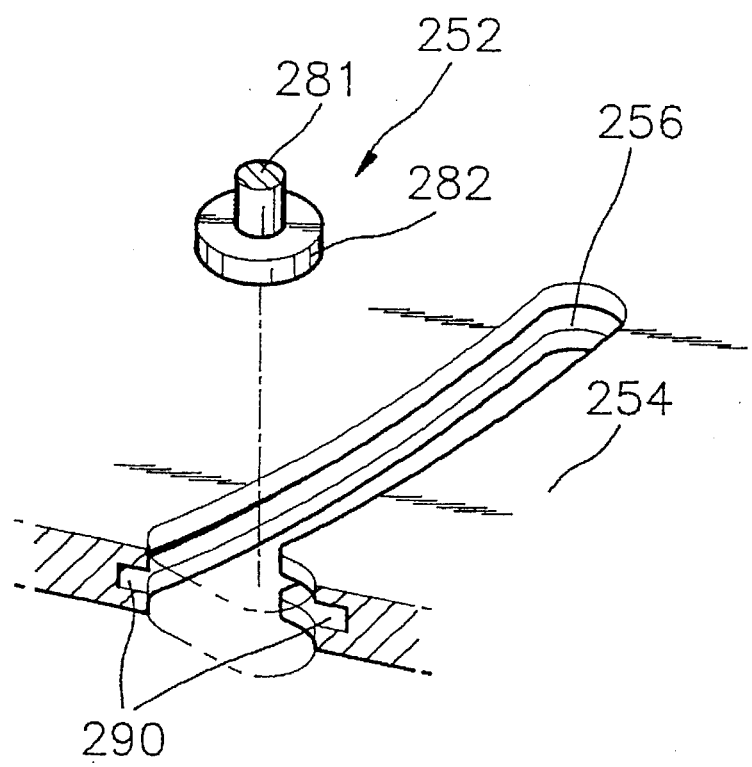
FIG. 6 offers a partial detailed view of the second preferred embodiment of the projection-lens driving apparatus shown in FIG. 5, showing an assembling process of a roller of the lower projection-lens holder and a lower plate.
Figure 7:
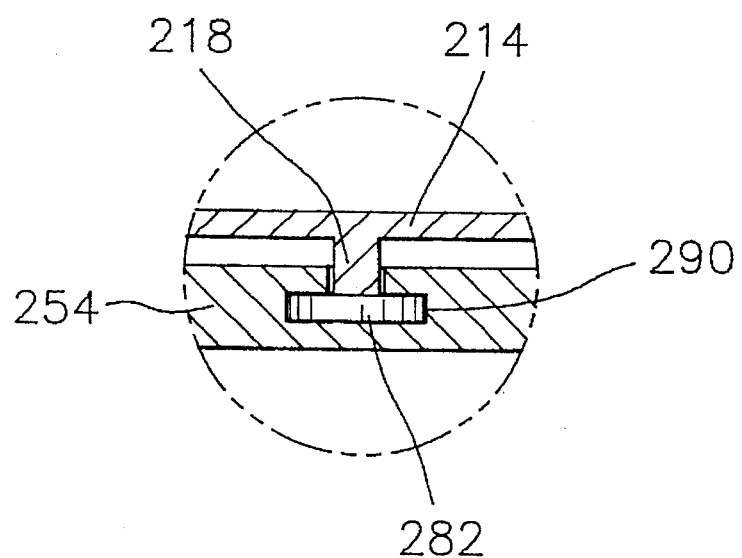
FIG. 7 exemplifies a partial cross sectional view of the second preferred embodiment of the projection-lens driving apparatus shown in FIG. 5, showing the assembled configuration of the roller and the lower plate.

Each of the lower projection-lens holders 14 includes a through hole 258 formed on the top surface thereof and is further provided with a pair of rollers 252 on the bottom surface thereof. Each of the rollers 252 of the lower projection-lens holders 214 is fitted into each of the trace slots 256 of the lower plate 254, the lower projection-lens holders 214 running parallel to each other. Each of the rollers 252 is provided with a rolling part 282 and a rotating shaft 281, the rolling part 282 being attached to one end of the rotating shaft 281, and each of the trace slots 256 is provided with a groove 290 formed along an internal periphery thereof, as shown in FIG. 6. The rolling part 282 in each of the rollers 252 is, then, fitted into the groove 290 on each of the trace slots 256 as shown in FIG. 7.

Furthermore, The upper projection-lens holder 218 is located above and between the pair of lower projection-lens holders 214 in such a way that an imaginary plane bisecting the upper projection-lens holder 218 vertically and longitudinally coincides with an imaginary plane parallel to and located at an equidistance from each of the two facing side surfaces from the pair of lower projection-lens holders 214.

The upper projection-lens holder 218 is provided with a pair of vertical inserting holes 216', each of the vertical inserting holes 216' extending from the top surface to the bottom surface thereof, a pair of protrusions 248 and a pair of guide slots 250 on the top surface thereof.

The pair of link pieces 246, 246' in each of the cross links 226 is articulated in a right-left and an upward-downward directions about a hinge point 247.

The upper projection-lens holder 218 is attached to the upper plate 220 using the pair of cross links 226 in such a way that a lower end of one link piece 246 in each pair of link pieces 246, 246' in each of the cross links 226 is coupled to one of the protrusions 248 on the upper projection-lens holder 218, an upper end thereof being fitted to one of the vertical motion guide slots 224 of the upper plate 220, and a lower end of the other link pieces 246' in the same pair is fitted to a corresponding one of the guide slots 250 of the upper projection-lens holder 218, an upper end thereof being fitted to a corresponding one of the straight motion guide slots 222 of the upper plate 220.

The guide member 234, consisting of a guide plate 233 and a pair of moving guide members 264, is provided between the upper and the lower projection-lens holders 218, 214 and engaged with the driving means 232 including the motor 228 and the feed screw 230. The guide plate 233 includes a top and a bottom surfaces, and is provided with a pair of engaging pins 236, a pair of laterally extended slots 266 and a threaded recess 238 with a predetermined depth extending at its center longitudinally, wherein one end of each of the engaging pins 236 is attached on the top surface thereof, each of the engaging pins 236 extending upward and being inserted into each of the vertical inserting holes 216' on the upper projection-lens holder 218.

Figure 8:
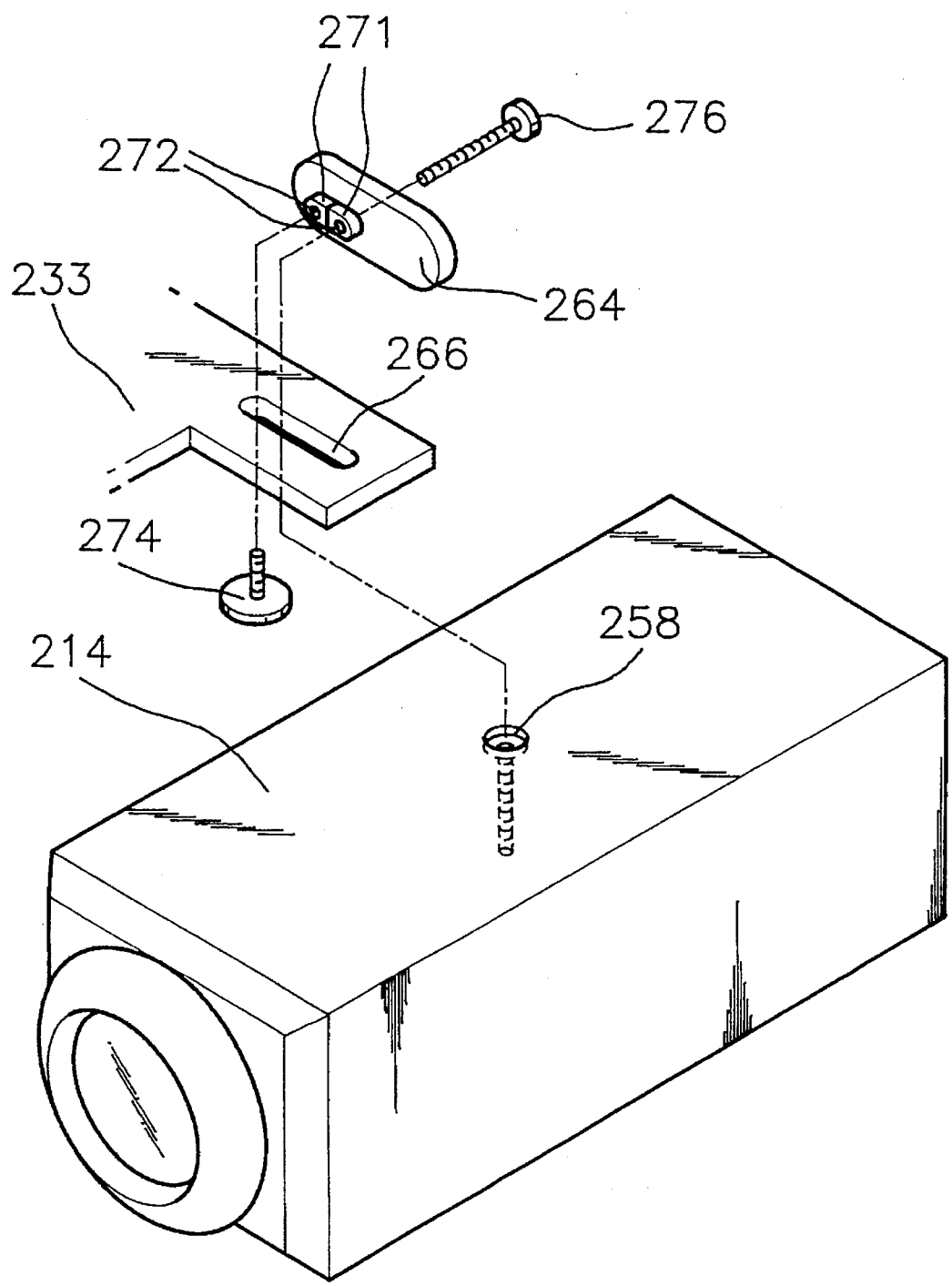
FIG. 8 sets forth a partial detailed view of the second preferred embodiment of the projection-lens driving apparatus shown in FIG. 5, showing an assembling process of a guide member and a lower projection-lens holder through a fastening member.

Each of the moving guide members 264 is coupled to each of the lower projection-lens holders 214 via each of the laterally extended slots 266 by using a fastening member 276, e.g., a screw, allowing each of the lower projection-lens holders 214 to move along the laterally extended slot 266. Specifically, each of the moving guide members 264 is provided with a pair of bosses 271, each of the bosses 271 having a tapped hole and being inserted into each of the laterally extended slots 266. Each of the moving guide members 264 is slidably mounted to the guide plate 233 by a bolt 274 which is fitted through the guide plate 233 from below and into one tapped hole of the pair of bosses 271, and then secured to each of the lower projection-lens holders 214 by the fastening member 276 which is fitted through the other tapped hole of the bosses 271 and the laterally extended slot 266 from above and into the through hole of each of the lower projection-lens holders 214, as shown in FIG. 8.

The feed screw 230 of the driving means 232 is engaged into the threaded recess 238 of the guide member 234. The pitch of the feed screw 230 corresponds to the pitch of the threaded recess 238.

The motor 228 of the driving means 232 is electrically connected to a control switch (not shown) on a panel (not shown) and is also connected to the feed screw 230.

Figure 9:
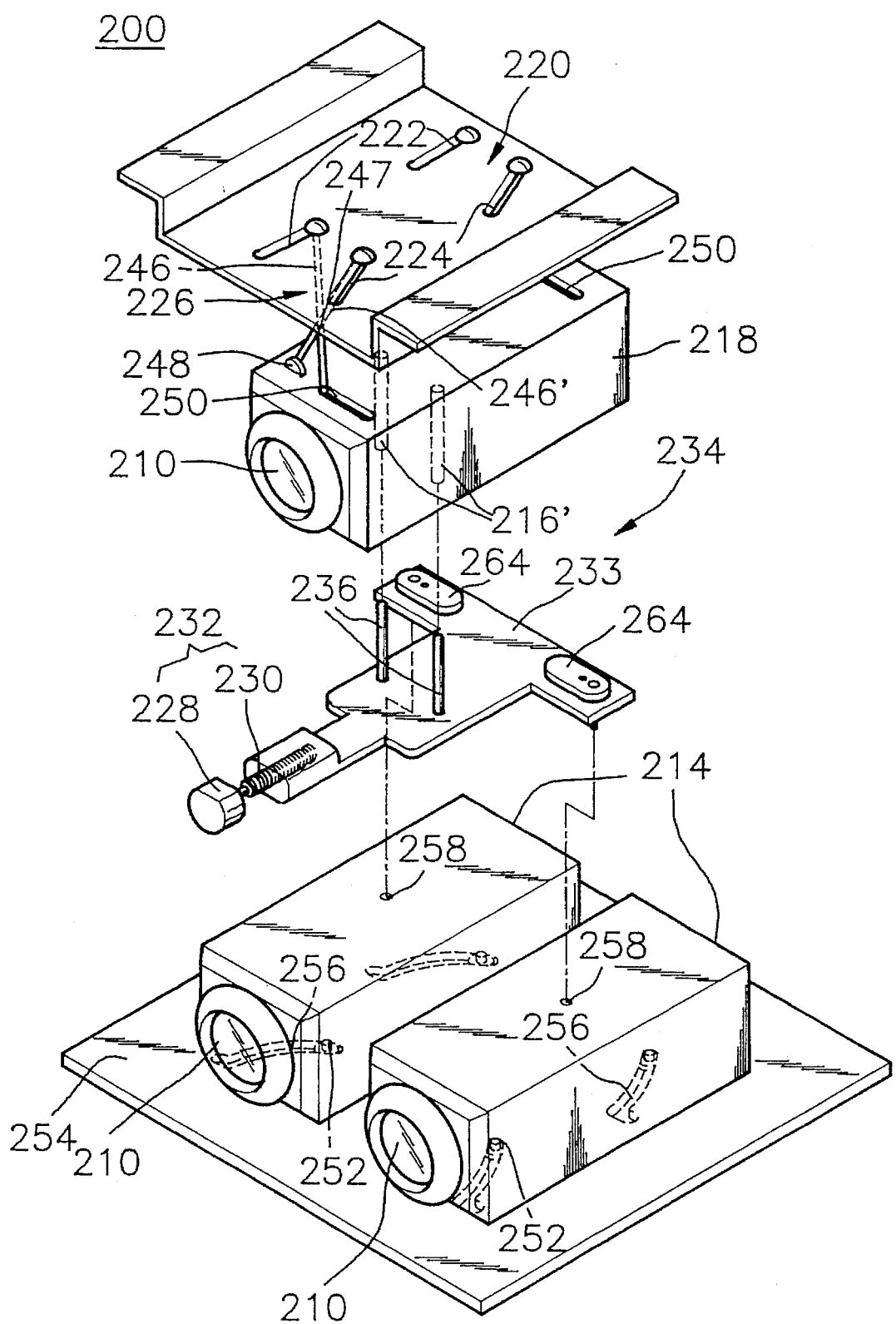
FIG. 9 demonstrates an assembled perspective view of the second preferred embodiment of the projection-lens driving apparatus shown in FIG. 5, showing the operation thereof.

The operation of the second embodiment of the present invention will now be described with reference to FIG. 9.

When an operator pushes the control switch on the panel (not shown) in order to match and focus projected images on a screen, the guide member 234 is driven toward the screen or away from the screen in response to the rotation of the motor 228 and hence the rotation of the feed screw 230 engaged with the threaded recess 238 thereof. Then, the pair of lower projection-lens holders 214 connected to each other via the guide member 234 are integrally driven toward or away from the screen and inward or outward with respect to the imaginary plane parallel to and located at an equidistance from each of the two facing side surfaces of the pair of lower projection-lens holders 214, the imaginary plane further being perpendicular to the screen.

The upper projection-lens holder 218 connected to the guide member 234 through the pair of engaging pins 236 of the guide plate 233 is also driven toward and away from the screen and the pair of the lower projection-lens holders 214.

For instance, when the guide member 234 is driven toward the screen in response to the rotation of the motor 228 and hence the rotation of the feed screw 230, the pair of lower projection-lens holders 214 are integrally driven toward the screen and inward with respect to the imaginary plane along the trace slots 256 by the movement of the guide member 234. At the same time, the upper projection-lens holder 218 is also driven toward the screen and the pair of lower projection-lens holders 214 along the pair of straight motor guide slots 222 and the pair of vertical motion guide slots 224 by means of the pair of cross links 226.

On the other hand, when the guide member 234 moves away from the screen, the lower and the upper projection-lens holders 214 and 218 are integrally driven in a reverse process.

Therefore, by controlling the rotation of the motor 228, the upper and the lower projection-lens holders 218 and 214 can be integrally driven, allowing the operator to synchronize the images on the screen simply, conveniently, accurately, and above all, simultaneously, as in the case of the first embodiment of the present invention.

FIG. 10 is a partial schematic view of a 3-beam projector incorporating therein the inventive projection-lens driving apparatus 100 and 200 illustrating its relationship to a screen S and a triplet of LCD panels 6a, 6b and 6c, wherein each of the LCD panels, e.g., 6a, is provided with a respective optical axis Ca, the optical axis Ca being parallel to the central axis L of the screen S.

The upper and the pair of lower projection-lens holders 18, 14 and 218, 214 are also arranged such that the optical axis of each of the projection lenses is parallel with respective optical axes Ca, Cb, Cc of the LCD panels 6a, 6b, 6c. The upper and the pair of lower projection-lens holders 18, 14 and 218, 214 are adjusted to move integrally toward and away from the screen S and move inward and outward and in parallel with the central axis L of the screen S, thereby enabling the operator to focus and match images simultaneously.

Although the invention has been shown and described with respect to the preferred embodiments, it will be understood by those skilled in the art that various changes and modifications may be made without departing from the spirit and scope of the invention as defined in the following claims.

What is claimed is:

1. A projection-lens driving apparatus including a housing having an upper face and a lower face for use in a 3-beam projector, the projection-lens driving apparatus comprising:

an upper plate fixed to the upper face of the housing and provided with a pair of straight motion guide slots and a pair of vertical motion guide slots;

an upper projection-lens holder provided with a top and a bottom surface, a pair of protrusions, a pair of vertical holes, each of the vertical holes extending from the top surface to the bottom surface thereof, and a pair of guide slots on the top surface thereof;

a pair of cross links, each of the cross links including a pair of link pieces articulated about a hinge point, wherein the upper projection-lens holder is mechanically connected to the upper plate through the pair of cross links in such a way that a lower end of one link piece in each pair of link pieces in each of the cross links is coupled to one of the protrusions on the upper projection-lens holder, an upper end thereof being fitted to one of the vertical motion guide slots of the upper plate, and a lower end of the other link piece in the same pair is fitted to a corresponding one of the guide slots of the upper projection-lens holder, an upper end thereof being fitted to a corresponding one of the straight motion guide slots of the upper plate;

a pair of lower projection-lens holders located on the lower face of the housing, running parallel to each other, each of the lower projection-lens holders being provided with a top and a bottom surface, a pair of side surfaces, a trace slot on the top surface thereof, and a horizontal inserting hole, wherein the horizontal inserting hole extends from one of the side surfaces to the other side surface thereof;

a guide member including a first guide plate and a second guide plate, the guide plates being separated from each other, the first guide plate having a top and a bottom surface, a pair of engaging pins on the top surface thereof, a pair of guide rods on the bottom surface thereof and a threaded through hole passing therethrough at its center longitudinally, each of the engaging pins extending vertically upward, each of the guide rods extending horizontally in an opposite direction from each other, and the second guide plate having a top and a bottom surface, a pair of guide protrusions on the bottom surface thereof and a threaded recess with a predetermined depth extending at its center longitudinally, the threaded through hole of the first guide plate and the threaded recess of the second guide plate being aligned with each other, wherein the upper projection-lens holder and the pair of lower projection-lens holders are mechanically connected through the guide member in such a way that the pair of engaging pins of the first guide plate are inserted into the pair of vertical holes on the upper projection-lens holder, each of the guide protrusions on the bottom surface of the second guide plate is engaged with one of the trace slots on each of the lower projection-lens holders, and each of the guide rods on the first guide plate is inserted into one of the horizontal inserting holes on each of the lower projection-lens holders; and driving means for driving the guide member including a motor and a feed screw with one end thereof attached to the motor, the feed screw including a lead part and a rear part, the lead part to be engaged into the threaded recess of the second guide plate and the rear part to be engaged with the threaded through hole of the first guide plate to thereby mechanically connect the first and the second guide plates, wherein a rotation of the motor causes a corresponding rotation of the feed screw, causing the guide member to move forward or away from a screen, which in turn causes the upper and the lower projection-lens holders fitted to the guide member mechanically to move integrally, thereby allowing the images to coincide on the screen.

2. The projection-lens driving apparatus of claim 1, wherein each of the upper and the lower projection-lens holders is provided with a projection lens.

3. The projection-lens driving apparatus of claim 1, wherein the upper projection-lens holder is located above and between the pair of lower projection-lens holders in such a way that an imaginary plane bisecting the upper projection-lens holder vertically and longitudinally coincides with an imaginary plane parallel to and located at an equidistance from each of the two facing side surfaces from the pair of lower projection lens holders.

4. The projection-lens driving apparatus of claim 1, wherein the lead part of the feed screw has a greater pitch than that of the rear part of the feed screw.

5. The projection-lens driving apparatus of claim 1, wherein the pitches on the lead and the rear parts of the feed screw match those on the threaded recess and the threaded through hole, respectively.

6. A projection-lens driving apparatus including a housing having an upper face and a lower face for use in a 3-beam projector, comprising:

an upper plate fixed to the upper face of the housing and provided with a pair of straight motion guide slots and a pair of vertical motion guide slots;

a lower plate fixed to the lower face of the housing and provided with two pairs of trace slots;

an upper projection-lens holder provided with a top and a bottom surface, a pair of protrusions, a pair of vertical holes, each of the vertical holes extending from the top surface to the bottom surface thereof, and a pair of guide slots on the top surface thereof;

a pair of cross links, each of the cross links including a pair of link pieces articulated about a hinge point, wherein the upper projection-lens holder is mechanically connected to the upper plate through the pair of cross links in such a way that a lower end of one link piece in each pair of link pieces in each of the cross links is coupled to one of protrusions on the upper projection-lens holder, an upper end thereof being fitted to one of the vertical motion guide slots of the upper plate, and a lower end of the other link piece in the same pair is fitted to a corresponding one of the guide slots of the upper projection-lens holder, an upper end thereof being fitted to a corresponding one of the straight motion guide slots of the upper plate;

a pair of lower projection-lens holders, each of the lower projection-lens holders provided with a top and a bottom surface, a pair of rollers and a threaded hole on the top surface thereof, each of the rollers being fitted into each of the trace slots of the lower plate, the lower projection-lens holders running parallel to each other;

a guide member including a guide plate and a pair of moving guide members, the guide plate having a top and a bottom surface, a pair of engaging pins on the top surface thereof, a pair of laterally extended slots, and a threaded recess with a predetermined depth, each of the engaging pins extending vertically upward, wherein the upper projection-lens holder and the pair of lower projection-lens holders are integrally connected through the guide member in such a way that the pair of engaging pins of the guide plate are inserted into the pair of vertical holes on the upper projection-lens holder, and the pair of moving guide members are coupled to the pair of lower projection-lens holders via the pair of laterally extended slots of the guide plate, respectively; and driving means for driving the guide member including a motor and a feed screw with one end thereof attached to the motor, the feed screw being engaged into the threaded recess of the guide plate, wherein a rotation of the motor causes a corresponding rotation of the feed screw, causing the guide member to move forward or away from a screen, which in turn causes the upper and the lower projection-lens holders fitted to the guide member to move integrally.

7. The projection-lens driving apparatus of claim 6, wherein each of the pair of moving guide members includes a pair of bosses, each of the bosses having a tapped hole and being inserted into each of the laterally extended slots on the guide plate.

8. The projection-lens driving apparatus of claim 6, wherein each of the upper and the lower projection-lens holders is provided with a projection lens.

9. The projection-lens driving apparatus of claim 6, wherein the upper projection-lens holder is located above and between the pair of lower projection-lens holders in such a way that an imaginary plane bisecting the upper projection-lens holder vertically and longitudinally coincides with an imaginary plane parallel to and located at an equidistance from each of the two facing side surfaces from the pair of lower projection lens holders.

10. The projection-lens driving apparatus of claim 6, wherein the pitch on the feed screw matches that on the threaded recess of the guide plate.

* * * * *